(12) United States Patent
Ebnabbasi

(10) Patent No.: US 9,450,306 B1
(45) Date of Patent: Sep. 20, 2016

(54) ANTENNA FOR WIRELESS COMMUNICATIONS

(71) Applicant: NXP B.V., Eindhoven (NL)

(72) Inventor: Khabat Ebnabbasi, San Jose, CA (US)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 14/706,653

(22) Filed: May 7, 2015

(51) Int. Cl.
| G06K 19/06 | (2006.01) |
| H01Q 7/00 | (2006.01) |
| G06K 19/077 | (2006.01) |
| H01Q 1/22 | (2006.01) |

(52) U.S. Cl.
CPC .......... *H01Q 7/00* (2013.01); *G06K 19/07781* (2013.01); *G06K 19/07786* (2013.01); *H01Q 1/2225* (2013.01)

(58) Field of Classification Search
CPC ............ H01Q 7/08; H01Q 1/40; H01Q 7/06; H01Q 1/04; H01Q 1/2225; H01Q 1/242; H01Q 1/243; H01Q 1/273; H01Q 1/3241; H01Q 21/24; H01Q 7/00; H01Q 7/07781; G06F 2203/0331; G06F 3/014; G06F 19/3462; G06F 3/017; G06F 3/041; G06K 19/07786; G06K 19/07728; G06K 19/07771
USPC .................... 235/492, 449, 488, 486, 487
See application file for complete search history.

(56) References Cited

U.S. PATENT DOCUMENTS

| 5,734,353 | A | 3/1998 | Van Voorhies | |
| 6,788,271 | B1 * | 9/2004 | Koo | H01Q 1/242 29/600 |
| 8,228,260 | B2 | 7/2012 | Huffer et al. | |
| 2002/0109636 | A1 | 8/2002 | Johnson et al. | |
| 2006/0132352 | A1 | 6/2006 | Schantz et al. | |
| 2010/0253476 | A1* | 10/2010 | Poutiatine | A61J 7/0053 340/10.1 |
| 2011/0133874 | A1* | 6/2011 | Prabhakaran | H01F 17/02 336/200 |
| 2011/0226857 | A1* | 9/2011 | Warther | G06K 19/04 235/488 |
| 2012/0052967 | A1* | 3/2012 | Grieshaber | A63B 37/0003 473/155 |
| 2012/0086619 | A1* | 4/2012 | Nakamura | G04G 21/04 343/788 |
| 2014/0306790 | A1* | 10/2014 | Fukui | H01F 27/006 336/196 |

FOREIGN PATENT DOCUMENTS

WO    2015010758 A1    1/2015

OTHER PUBLICATIONS

Andrenko, "Conformal Fractal Loop Antennas for RFID Tag Applications" 2005 Fujitsu Laboratories LTD, Yokoshua Japan. pp. 6.
Chaabane H., "A methodology for the Design of Frequency and Environment Robust UHF RFID Tags", IEEE Transactions on Atennas and Propagation, vol. 59, No. 9, Sep. 2011.

(Continued)

*Primary Examiner* — Thien M Le

(57) ABSTRACT

An apparatus includes an antenna structure with a core shaped as a toroid that is designed to be worn on a human digit. A first and second contact are located on the core. A conductive path connects the first contact and the second contact and includes a first set of windings that traverse a circumference of the core in a substantially parallel manner; and a second set of windings that traverse the circumference of the core in a substantially parallel manner. The windings are such that, from a vantage point exterior to the core, the first set of windings is substantially perpendicular to the second set of windings.

16 Claims, 4 Drawing Sheets

(56) References Cited

OTHER PUBLICATIONS

Kyounghwan Lee, et al., "Design Automation of UHF RFID Tag Antenna Using a Genetic Algorithm Linked with MWS CST", 4th IEEE International Symposium on Electronic Design, Test & Applications, 2008.

Skutt et al., "Characterization of Dimensional Effects in Ferrite-Core Magnetic Devices", Bradley Dept of Electrical Engineering, Virginia Tech, Blacksburg, VA 1996 IEEE pp. 1435-1440. 1996.

Wang D., et al., "Optimization of Tag Antenna for RFID System", 2009 International Conference on Information Technology and Computer Science, 2009.

Deyan Wu, et al., "Evolutionary Design of On-chip Antenna for HF Label", 2009 World Congress on Computer Sceince and Information Engineering, 2009.

* cited by examiner

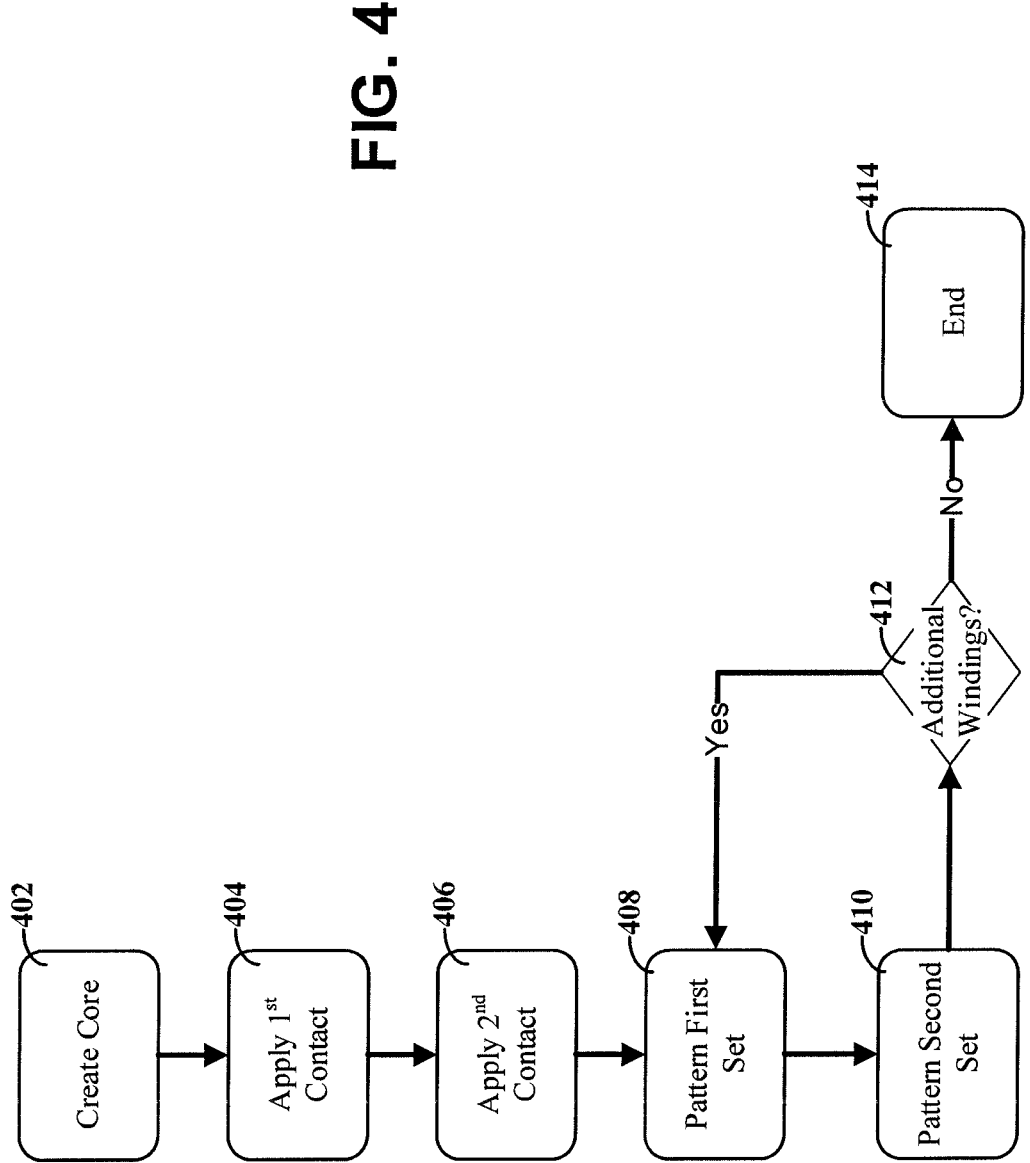

ANTENNA FOR WIRELESS COMMUNICATIONS

Near field communication (NFC) and high frequency (HF) radio frequency identification (RFID), has rapidly grown for commercial applications such as peer-to-peer, payment, and card emulation. RFID systems can include an RFID reader device (also referred to as a "reader device" or just a "reader") that generates an RF signal that can be received and used by an RFID tag device (also referred to as a "tag device" or just a "tag"). The tag device can, in some instances, harvest power from the received RF signal and also transmit data back to the reader by modulating the RF signal. The size and ruggedness of tags allows for the use of tags in a number of different applications. One such area includes mobile technologies, and more specifically, wearable technologies.

While various approaches have been implemented for wearable RFID devices, such devices may be susceptible to practical issues with establishing and maintaining wireless communication with an RFID reader due to antenna orientation and other problems. These issues can be particularly relevant to certain applications, such as implantable tag devices. These and other matters have presented challenges to communications and related aspects such as antenna orientations, for a variety of applications.

Various example embodiments are directed to an apparatus or device that includes an antenna structure with a core shaped as a toroid that is designed to be worn on a human digit. A first and second contact are located on the core. A conductive path connects the first contact and the second contact and includes a first set of windings that traverse a circumference of the core in a substantially parallel manner; and a second set of windings that traverse the circumference of the core in a substantially parallel manner. The windings are such that, from a vantage point exterior to the core, the first set of windings is substantially perpendicular to the second set of windings.

Embodiments are directed toward a system that includes an implantable circuit that includes a wireless communication circuit. A core is shaped as toroid and is designed with an exterior and an interior with a respective circumference that is designed to be worn on a human digit. A conductive path that includes a first winding that traverses the toroid while alternating between the exterior and the interior for respective portions of the core; and a second winding that traverses the toroid while alternating between the exterior and the interior for respective portions of the core in a manner that the first winding is on the interior for portions where the second winding is on the exterior.

According to certain embodiments, a method for creating an antenna structure includes creating a core shaped as a toroid that is designed to be worn on a human digit. A first contact and a second contact are applied on the core. A conductive path is created that connects the first contact and the second contact. The path is created by: alternating between a first winding pattern that traverses a circumference of the core in a first substantially parallel manner; and a second winding pattern that traverse the circumference of the core in a second substantially parallel manner. The winding patterns are such that, from a vantage point exterior to the core, first and second winding patterns are substantially perpendicular to one another.

The above discussion/summary is not intended to describe each embodiment or every implementation of the present disclosure. The figures and detailed description that follow also exemplify various embodiments.

Various example embodiments may be more completely understood in consideration of the following detailed description and in connection with the accompanying drawings, in which:

FIG. 4 depicts a flow diagram for creating an antenna structure, consistent with embodiments of the present disclosure.

Figure 1:
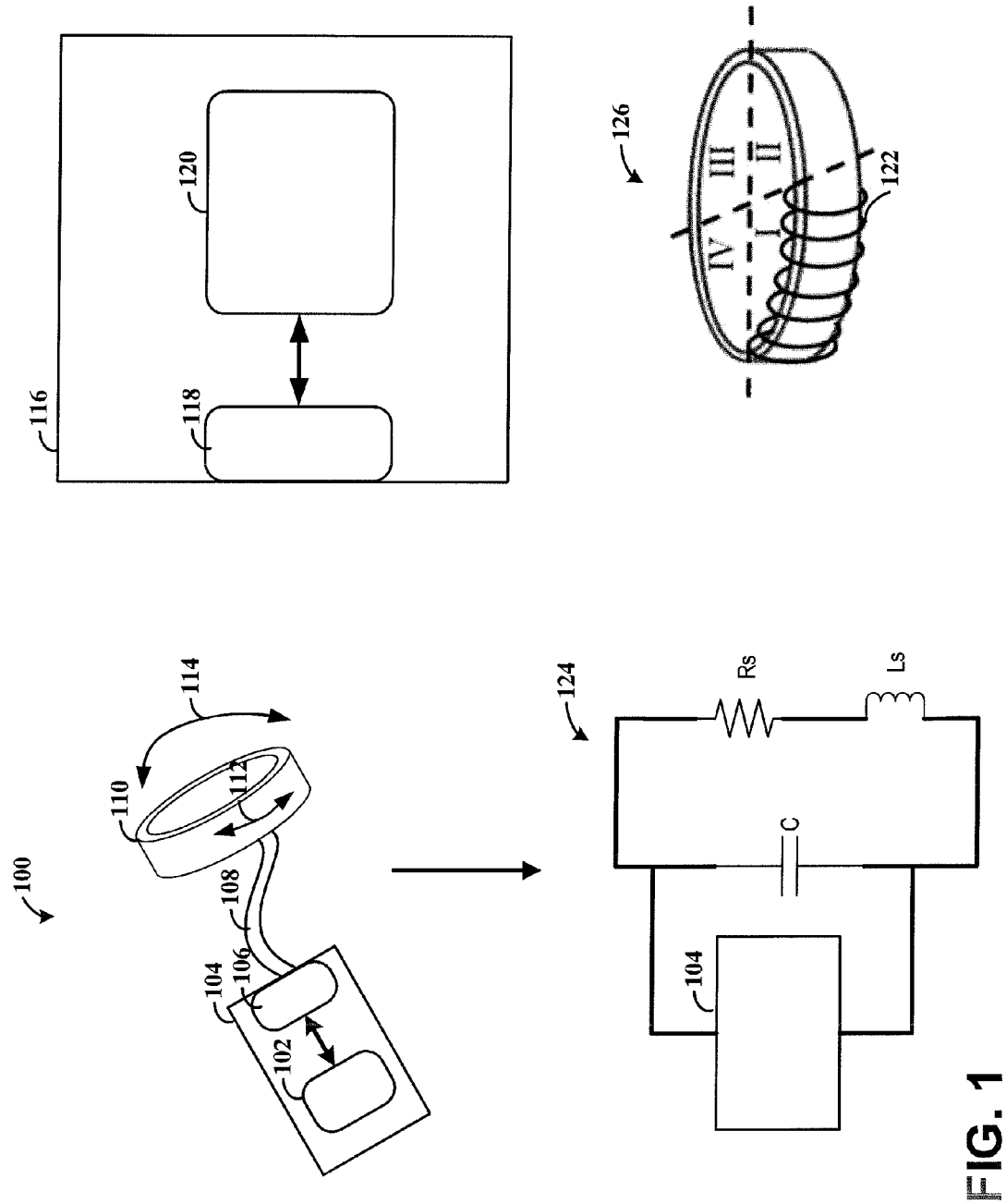
FIG. 1 depicts a block diagram of a system for RF communication, consistent with embodiments of the present disclosure.

While various embodiments discussed herein are amenable to modifications and alternative forms, aspects thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

Aspects of the present disclosure are believed to be applicable to a variety of different types of apparatuses, systems and methods involving wireless communications and specialized antennas. Aspects of the present disclosure have been shown to be beneficial when used in the context of wearable wireless devices. For example, one or more embodiments may be adapted to an antenna that is designed to be worn on a digit (finger or toe) of a person. While not necessarily so limited, various aspects may be appreciated through a discussion of examples using such contexts.

Embodiments of the present disclosures are directed toward a wearable antenna that is designed to be worn on a digit of a person, while also being configured to be used for wireless communication for different rotations of the antenna relative to another device and the other device's corresponding antenna. For instance, the wearable antenna can be configured such that, or any rotation, at least one conductive path (e.g., a wire) is at about a 45° angle, or greater, relative to a conductive path of the other antenna and relative to a corresponding vantage point from the other antenna.

Consistent with certain embodiments, a wearable antenna can have a toroid-shaped core. An opening in the core can be designed to allow the antenna to be worn on a digit of a person. The antenna includes a conductive path with multiple windings about the core, where each winding represents one traversal of the circumference of the core. Together, the multiple windings represent a single conductive path that is designed to allow for current to flow from one end of the path to the other end of the path. Each end of the path can be connected to contacts and a wireless (e.g., HF-RFID) communication circuit.

Consistent with some embodiments, the windings of a wearable antenna can be separated into two different sets of windings, where each winding traverses a circumference of the core by alternating between an internal portion—forming the opening, and an external portion of the core. As discussed in more detail herein, each of the windings in the same set can follow an antenna pattern in which the conductive paths, or wires, of the windings are substantially parallel to one another. The orientations of the windings from the different sets, however, can be substantially perpendicular, when viewed from a vantage point that is exterior to the core.

Wearable electronic products can be used for a variety of purposes including, but not limited to, the medical field (e.g., wearable hearing aids and pacemakers). NFC-capable devices can be used for security applications, such as unlocking mobile phones, and sharing information like Wi-Fi passwords, links to websites, contact information, etc. Wearable technologies also can be used in automation and security systems such as car and home security systems.

Security capabilities can be hampered by the use of more than one integrated circuit (IC) or the addition of security elements within an IC. For instance, the addition of a secure element to NFC controller can consume more chip space, making the chip bigger, and increase the power consumption. For applications in which the NFC controller has limited power (e.g., powered by an RF signal from a reader device), increases in power demands can negatively impact the read range. A particular type of wearable technology are rings that can be worn by a person and used as an antenna. NFC rings for wearable technology applications can cause security to suffer from problems with maintaining communication with the reader antenna while the ring is worn, and may need multiple different antenna patterns and designs for different sizes of rings.

Various embodiments of the present disclosure utilize an antenna structure that uses polarization to reduce the connection loss due to rotation, and include an antenna layout design that can accommodate different finger sizes for a single structure. Particular embodiments relate to a design that is relatively thin and has a high Q factor value.

Circular loop antennas can be designed for reliable use in the ultra-high frequency (UHF) RFID domain. Particular embodiments of the present disclosure relate to antennas that are designed for use with the HF RFID/NFC domain (e.g., inductive coupling at frequencies around 3 MHz to around 30 MHz or at around 13.56 MHz). Consistent with embodiments, a ring antenna can be used with a microcontroller circuit, such as a secure authentication microcontroller. The secure authentication microcontroller may, for example, be configured to communicate one or more secure codes to an RFID reader device. This might, for example, validate the reader device before making patient data available (e.g., in the context of an implantable medical device). In another example, the authentication could be used to provide access to functions of the RFID reader device (e.g., automated access to a cellular smart phone).

The ring antenna can be used for applications in high frequency (HF) range with low power/small signals. Accordingly, losses related to physical dimension and field distributions can largely be ignored, as they are mostly relevant to high power devices. Consistent with embodiments, the core or the ring carrier can be constructed from non-magnetic material and there is no need to consider core losses and induced eddy current.

Turning now to the figures, FIG. 1 depicts a block diagram of a system for RF communication, consistent with embodiments of the present disclosure. A reader device 116 can include a communication circuit 118 and a control circuit 120 that are designed to establish communication with one or more tag devices. For instance, the control circuit 120 can include a microcontroller and a memory circuit and the communication circuit 118 can include a transceiver circuit and an antenna. Consistent with embodiments, the reader device can be configured to communicate with HF RFID capable devices.

A tag device 100 can be configured to communicate with the reader device 116. The tag device can include a control circuit 102 and a communication circuit 106. Consistent with embodiments, the tag device 100 can be configured to all, or some, of the circuits powered by an RF signal received from a reader device. The communication circuit 106 can be connected to a toroid-shaped antenna 110 by a set of wires or similar conductors 108.

Consistent with embodiments, the antenna 110 can be designed to be worn on a human digit. For instance, standard ring sizes for fingers can have an inner circumference that ranges from 1.44 inches to 3.05 inches. As discussed in more detail herein, the antenna 110 can be configured so it can receive a signal from reader 106 while being rotated in multiple directions 112, 114. For example, the antenna can be constructed by creating a conductive path that follows a pattern for which at least a portion of the conductive path is not parallel with the direction of flux from the antenna reader for any particular orientation.

Circuit diagram 124 depicts a small signal equivalent circuit for the tag device 104 and antenna 110. The antenna pattern and core structure can each be designed based upon a number of factors. For instance, the flux density varies in reverse proportion with the ring radius. This can result in the magnetic field being significantly higher on the inner edge of the core rather than the outer portion of the toroid. Accordingly, various embodiments are directed toward keeping the width of the toroid core (or carrier) as thin as possible to help provide a uniform flux density. A small ratio of outer diameter over inner diameter (OD/ID) also prevents small thermal gradients between different portions of the core. Although this factor can often be neglected for the small signals, thermal gradients can still have an effect, such as where the temperature varies rapidly over time. The $R_s$ is a function of the air-core inductance ($L_0$) and angular velocity ($\omega$) or frequency (f) where $R_s = L_0 \omega$, $L_0 = (\mu_0 N^2 A_e)/l_e$, and $\omega = 2\pi f$. Here, $A_e$ and $l_e$ are effective core geometries and are equal to: $A_e = C_1/C_2$, $l_e = C_1^2/C_2$. $C_1$ and $C_2$ represent core constants that are computed for toroidal cores in terms of core height (h), and inner ($r_i$) and outer ($r_o$) radii of the core, where $2\pi/h \ln(r_o/r_1)$ and $2\pi(1/r_i - 1/r_0)/h^2 \ln^3(r_0/r_1)$, respectively. As such, reducing the ratio of the outer diameter to the inner diameter can reduce adverse effects resulting from variations in flux density within the core. Accordingly, it can be helpful to use a very thin core. The induced flux density in the core and the voltage across the parallel R-L model are directly related by the transformer equation: $V_{rms} = \sqrt{2} \pi N A_e B_m f$, where $V_{rms}$ and $B_m$ are the root mean square (rms) values of the induced voltage and the peak and the peak value of the sinusoidal flux density, respectively. Since the voltage across the inductor in the series model is determined by voltage divider between the resistor and inductor, the flux density in the core is not directly related to the excitation voltage.

Consistent with embodiments, each winding on the core wraps fully around the circumference of the toroid. Depending on the wire rotation angle, a uniform winding reduces the amount of flux that leaves the core, and thus provides for a more uniform flux density. View 126 shows a ring that is segmented into four equal size quadrants sequentially numbered as I, II, III, and IV. For a winding 122 with a wire rotation angle that is the same around the entire ring, the flux density ($\Phi$) ratio for a small ring and relative to the contribution from quadrant I is $\Phi_{II}/\Phi_I = \Phi_{IV}/\Phi_I \approx 0.4$ and $\Phi_{III}/\Phi_I$ is slightly smaller. One way to link all parts uniformly with ratio equal to ~1, would be for the core to be magnetic with permeability more than 1000, however this may not be feasible for commercial applications. Embodiments are directed toward a solution in which, for example, the pattern can be designed to have conductive paths on the exterior side of the ring that are substantially perpendicular to conductive paths on the interior of the ring, relative to a line passing through the center of the opening for the toroid.

Figure 2:
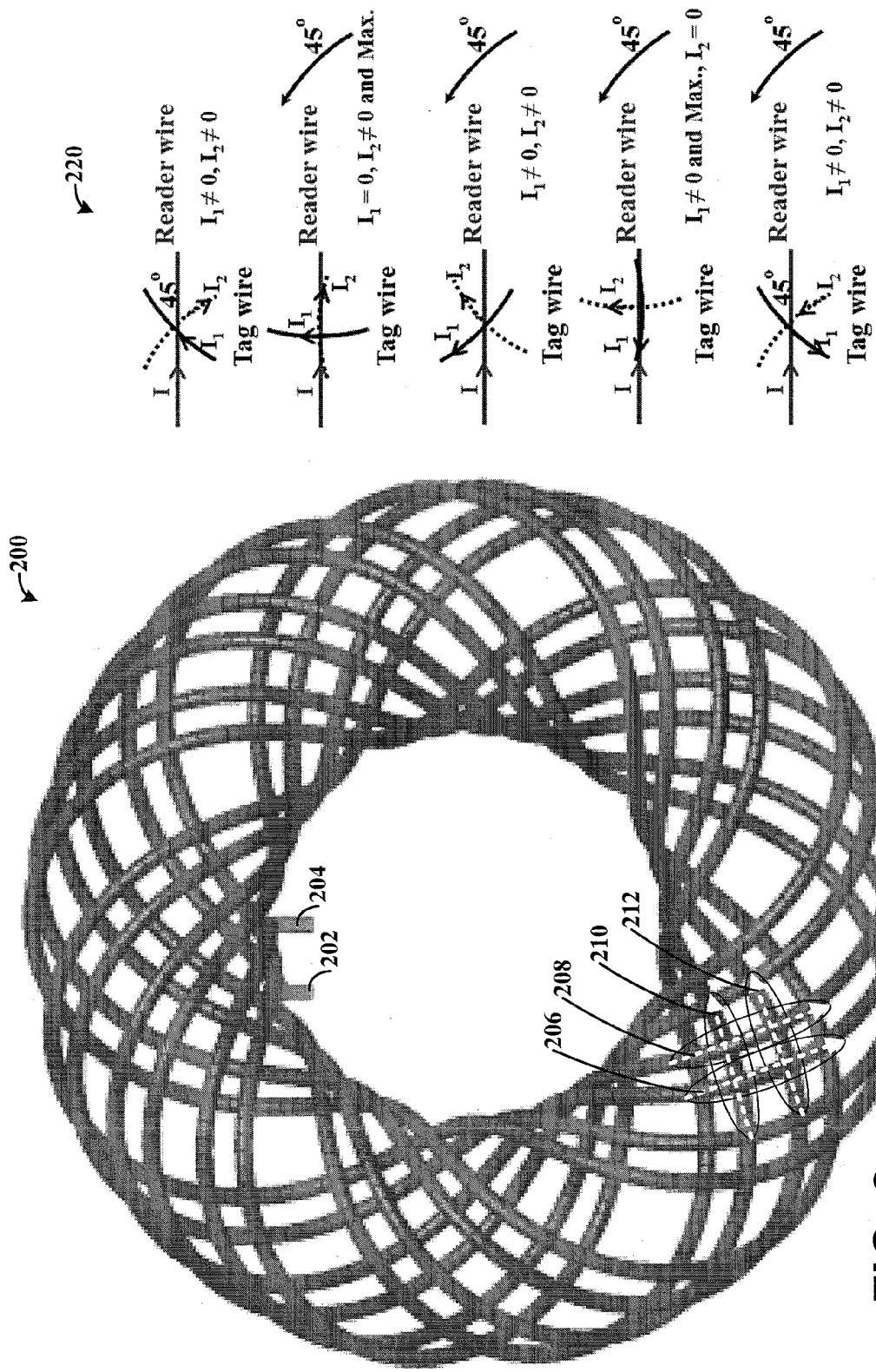
FIG. 2 depicts a top down view 200 of an antenna pattern, consistent with embodiments of the present disclosure.

FIG. 2 depicts a top down view 200 of an antenna pattern, consistent with embodiments of the present disclosure. The antenna pattern 200 includes a plurality of windings that each traverse the circumference of the toroid core, which is not shown to allow for the windings on both sides of the core to be visible. Contact points, or terminals, 202 and 204 can be connected to respective ends of the conductive path formed by the windings. In certain embodiments, a transceiver circuit for a tag device can be connected across the terminals 202 and 204.

A portion of a first set of two windings, 206 and 208, are circled in FIG. 2. The directional arrows indicate a possible direction of current for reference relative to the different windings (although the current direction can be reversed, which would result in a corresponding reversal in each winding). As depicted in view 200 of FIG. 2, the physical orientation of the windings 206 and 208 are substantially parallel to one another, resulting in the direction of current flow also being substantially parallel with respect to each winding. The windings 206 and 208 are depicted as being on the top portion of the core (i.e., extending out of the page toward the viewer) at the circled location.

A portion of a second set of two windings, 210 and 212, are also circled in FIG. 2. The directional arrows again indicate a direction of current for reference relative to the different windings. As depicted in FIG. 2, the physical orientation of the windings 210 and 212 are substantially parallel to one another, resulting in the direction of current flow also being substantially parallel with respect to each winding. The physical orientation of the windings 210 and 212 is, however, substantially perpendicular to the windings 206 and 208, relative to the vantage point of the viewer of the figure. The windings 210 and 212 are depicted as being on the bottom portion of the core at the circled location. In certain embodiments, the core is designed to be relatively thin, and thus, either (or both) set of the windings can contribute to an inductive coupling between the tag and reader.

View 220 shows a number of possible orientations and corresponding induced currents from windings of two different sets of windings. For instance, I can represent the current through an antenna (reader) wire of the reader device, while $I_1$ can correspond to current induced in windings 210 or 212, and $I_2$ can correspond to current induced in winding 206. In this view, the windings corresponding to $I_1$ and $I_2$ are shown with a directional arrow that corresponds to the directional arrow in view 200. It is noted that the current direction may be in the opposite direction for certain orientations depicted in view 220. As shown by the current values, at least one of the antenna wires will be inductively coupled to the reader wire for all orientations. Moreover, for any orientation in which one wire is parallel with the reader wire, the other wire will be substantially perpendicular and therefore maximally coupled (where maximum coupling is with consideration to physical orientation only).

Figure 3:
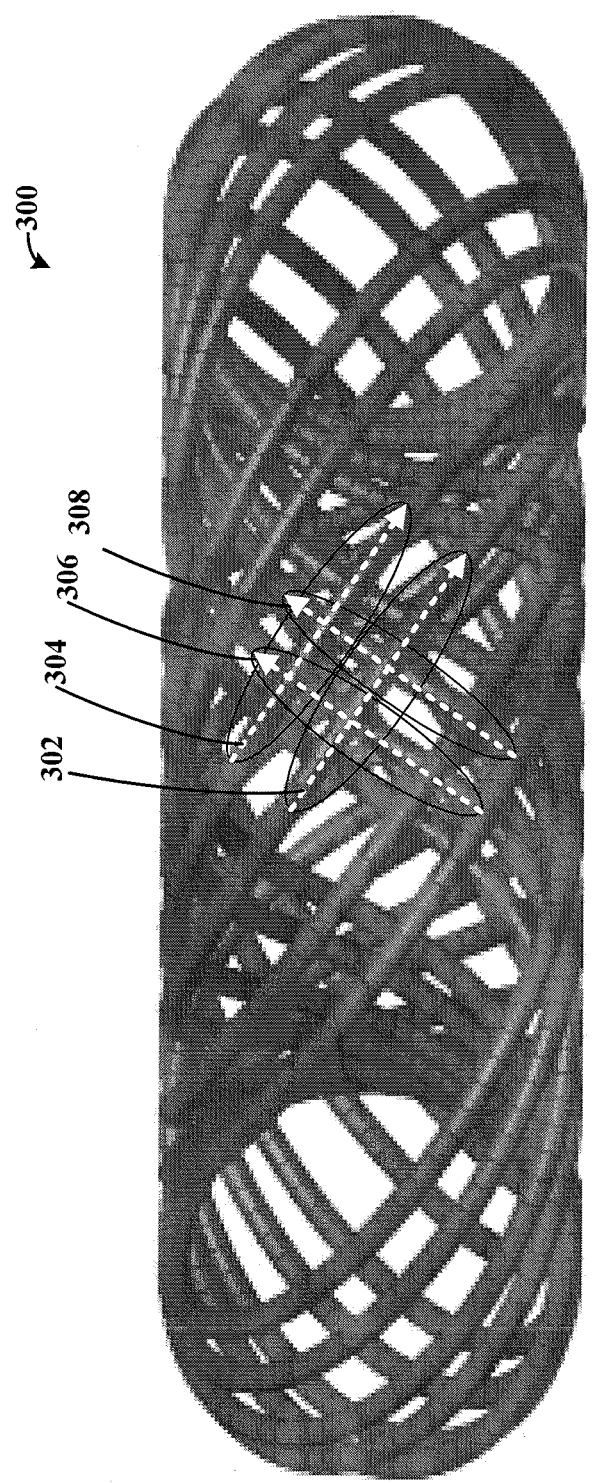
FIG. 3 shows a side view 300 of an antenna structure, consistent with embodiments of the present disclosure.

FIG. 3 shows a side view 300 of an antenna structure, consistent with embodiments of the present disclosure. Consistent with FIG. 2, the antenna structure is shown without the core present. Windings 302 and 304 form part of a first set of windings that are on the outside of the core, relative to the central opening for a digit of a person.

Windings 306 and 308 form part of a second set of windings that are on the inside of the core. The orientations between the two sets of windings are similar to those described in connection with FIG. 2 in that windings of the same set are substantially perpendicular and windings of different sets are substantially perpendicular, relative to a particular vantage point.

The depicted example of FIGS. 2 and 3 shows ten different windings. Various embodiments can include more or less windings depending upon the considerations of the particular implementation. The considerations can include, but are not necessarily limited to, communication frequencies, wireless signal strength of the reader device, limitations of the communication circuitry for the tag device, and cost.

FIG. 4 depicts a flow diagram for creating an antenna structure, consistent with embodiments of the present disclosure. To begin with, a toroid-shaped core that is designed to wear on a digit of a person can be created, per block 402. As discussed herein, the core can be non-magnetic and have an opening sufficient to be worn as a ring. Two contacts can be added to the core, per blocks 404 and 406. The contacts can be added at different times depending upon the particular implementation and manufacturing process. For instance, the contacts can be added to the core before, after, or during, the application of the windings. In some embodiments, the contacts can be a pad or part of a physical connector that a wire, or similar conductor, can be attached using solder, physical connectors, and combinations thereof.

Beginning at a location corresponding to one of the contacts, a conductive path according to a first pattern set can be applied to the core, per block 408. As discussed herein, the first part of conductive path can follow the first pattern and wrap round the inside and outside of the core while traversing the circumference of the core once. Continuing from the end of a first winding created per block 408, the conductive path can continued to be applied to the core according to a second pattern set, per block 410. As discussed herein, the second pattern can be configured such that from different vantage points external to the core, the winding corresponding to the second pattern is substantially perpendicular to the previously-applied winding, which corresponds to first pattern.

A determination can then be made as to whether or not additional windings are to be added, per block 412. If additional windings are to be added, then the alternating patterning, between first and second patterns, can be repeated per blocks 408 and 410. As shown and discussed in other figures, each new winding for a set can be shifted slightly from a previous winding in the same set and applied in a substantially perpendicular manner. If no additional windings are to be added, the end of the present winding can be connected to one of the contacts that is not already connected. The process can then end, per block 414.

In some embodiments, the conductive path can be applied by a printing process in which conductor material is applied to the core. Wire or similar conductor material can also be applied following the antenna pattern.

Various blocks, modules or other circuits may be implemented to carry out one or more of the operations and activities described herein and/or shown in the figures. In these contexts, a "block" (also sometimes "logic circuitry" or "module") is a circuit that carries out one or more of these or related operations/activities (e.g., performing secure authentication and carrying out related RFID communications). For example, in certain of the above-discussed embodiments, one or more modules or blocks are discrete logic circuits or programmable logic circuits configured and arranged for implementing these operations/activities, as in the circuit modules shown in FIG. 1. The operations may be carried out in a logic circuit programmed to operate the indicated steps. In certain embodiments, such a programmable circuit is one or more computer circuits programmed to execute a set (or sets) of stored instructions (and/or configuration data). The instructions (and/or configuration data) can be in the form of firmware or software stored in and accessible from a memory (circuit). In addition, the various embodiments described herein may be combined in certain embodiments, and various aspects of individual embodiments may be implemented as separate embodiments.

Certain embodiments are directed to a computer program product (e.g., nonvolatile memory device), which includes a machine or computer-readable medium having stored instructions thereon which may be executed by a computer (or other electronic device) to perform one or more operations/activities disclosed herein.

Based upon the above discussion and illustrations, those skilled in the art will readily recognize that various modifications and changes may be made to the various embodiments without strictly following the exemplary embodiments and applications illustrated and described herein. For example, the core could be an imperfect toroid. Similarly, different materials and methods of application could be used for the windings. Such modifications do not depart from the true spirit and scope of various aspects of the disclosure, including aspects set forth in the claims.

What is claimed is:

1. An apparatus comprising:
   an antenna structure includes:
      a core shaped as a toroid that is designed to be worn on a human digit;
      a first contact on the core;
      a second contact on the core; and
      a conductive path connecting the first contact and the second contact and including:
         a first set of windings that traverse a circumference of the core in substantially parallel manner;
         a second set of windings that traverse the circumference of the core in a substantially parallel manner; and
         wherein, from a vantage point exterior to the core, the first set of windings, at a location on an exterior of a portion of the core, is substantially perpendicular to the second set of windings, at a location on an interior of the portion of the core.

2. The apparatus of claim 1, wherein the core is non-magnetic.

3. The apparatus of claim 1, wherein the core has an opening which is greater than 1.44 inches and less than 3.05 inches.

4. The apparatus of claim 1, wherein the first and second set of windings are configured such that, for any rotation of the antenna structure, at least one conductive path is at least about a 45° angle relative to a particular conductive path of another antenna.

5. The apparatus of claim 1, wherein the antenna structure is designed for use with inductive coupling occurring at frequencies from about 3 MHz to about 30 MHz.

6. The apparatus of claim 1, wherein the antenna structure includes ten windings.

7. A system comprising:
   an implantable circuit that includes a wireless communication circuit;
   an antenna structure connected to the wireless communication circuit and that includes:
      a core that is shaped as toroid and that is designed with an exterior and an interior with a respective circumference that is designed to be worn on a human digit
      a conductive path that includes:
         a first winding that traverses the toroid while alternating between the exterior and the interior for respective portions of the core; and
         a second winding that traverses the toroid while alternating between the exterior and the interior for respective portions of the core in a manner that the first winding is on the interior for portions where the second winding is on the exterior.

8. The system of claim 7, wherein the wireless communication circuit is configured to communicate with a high frequency (HF) radio frequency identification (RFID) reader device.

9. The system of claim 8, wherein the implantable circuit includes a secure code for communication with the RFID reader device.

10. The system of claim 8, wherein the core is non-magnetic.

11. The system of claim 7, wherein the conductive path includes at least ten windings.

12. A method comprising:
   providing a core shaped as a toroid that is designed to be worn on a human digit;
   providing a first contact on the core;
   providing a second contact on the core; and
   providing a conductive path connecting the first contact and the second contact; and
   wherein, from a vantage point exterior to the core, the conductive path includes first and second winding patterns that each traverse the entire circumference of the toroid by alternating between an inner portion and an outer portion of the toroid and are substantially perpendicular to one another with respect to respective winding patterns on each of the inner and outer portions.

13. The method of claim 12, wherein providing a conductive path includes alternating between a first winding pattern that traverses a circumference of the core in a first substantially parallel manner; and a second winding pattern that traverses the circumference of the core in a second substantially parallel manner.

14. The method of claim 12, wherein providing a conductive path includes printing a conductive material on the core.

15. The method of claim 12, wherein the core is non-magnetic.

16. The method of claim 13, further comprising repeating the alternating between the first winding pattern and the second winding pattern to produce at least ten windings.

* * * * *